United States Patent
Vinggaard et al.

(10) Patent No.: US 6,298,084 B1
(45) Date of Patent: Oct. 2, 2001

(54) BAD FRAME DETECTOR AND TURBO DECODER

(75) Inventors: Niels Vinggaard, Arlington Heights; Ashish Batra, Harvard; Brett Robertson, Arlington Heights; Brian Keith Classon, Streamwood, all of IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/199,114

(22) Filed: Nov. 24, 1998

(51) Int. Cl.[7] .............................. H04B 17/00; H04B 3/46; H04Q 1/20
(52) U.S. Cl. ............................ 375/224; 375/341; 714/795
(58) Field of Search ........................ 375/224, 262, 375/265, 341; 714/704, 795

(56) References Cited

U.S. PATENT DOCUMENTS

| | | | |
|---|---|---|---|
| 5,113,400 | * 5/1992 | Gould et al. | 714/795 |
| 5,321,705 | * 6/1994 | Gould et al. | 714/795 |
| 5,497,383 | * 3/1996 | Thome et al. | 714/795 |
| 5,815,507 | * 9/1998 | Vinggaard et al. | 714/704 |

* cited by examiner

Primary Examiner—Chi Pham
Assistant Examiner—Phuong Phu
(74) Attorney, Agent, or Firm—Randall S. Vaas

(57) ABSTRACT

A window error detector for a receiver capable of operating in a discontinuous transmit mode includes a soft decision decoder (210) producing soft output and generating window error signals. A detector (214) is coupled to the soft decision decoder for detecting a bad frame when the window error exceeds a bad frame threshold, wherein the threshold is altered based on the discontinuous transmit state. A turbo decoder (210) for a receiver includes a soft decision decoder and a window error detector (214) coupled to the soft decision decoder. The window error detector generates a bad frame indication. The turbo decoder stops iterative processing of the data associated with a window when the window error detector detects that the window does not result in a bad frame indication.

5 Claims, 3 Drawing Sheets

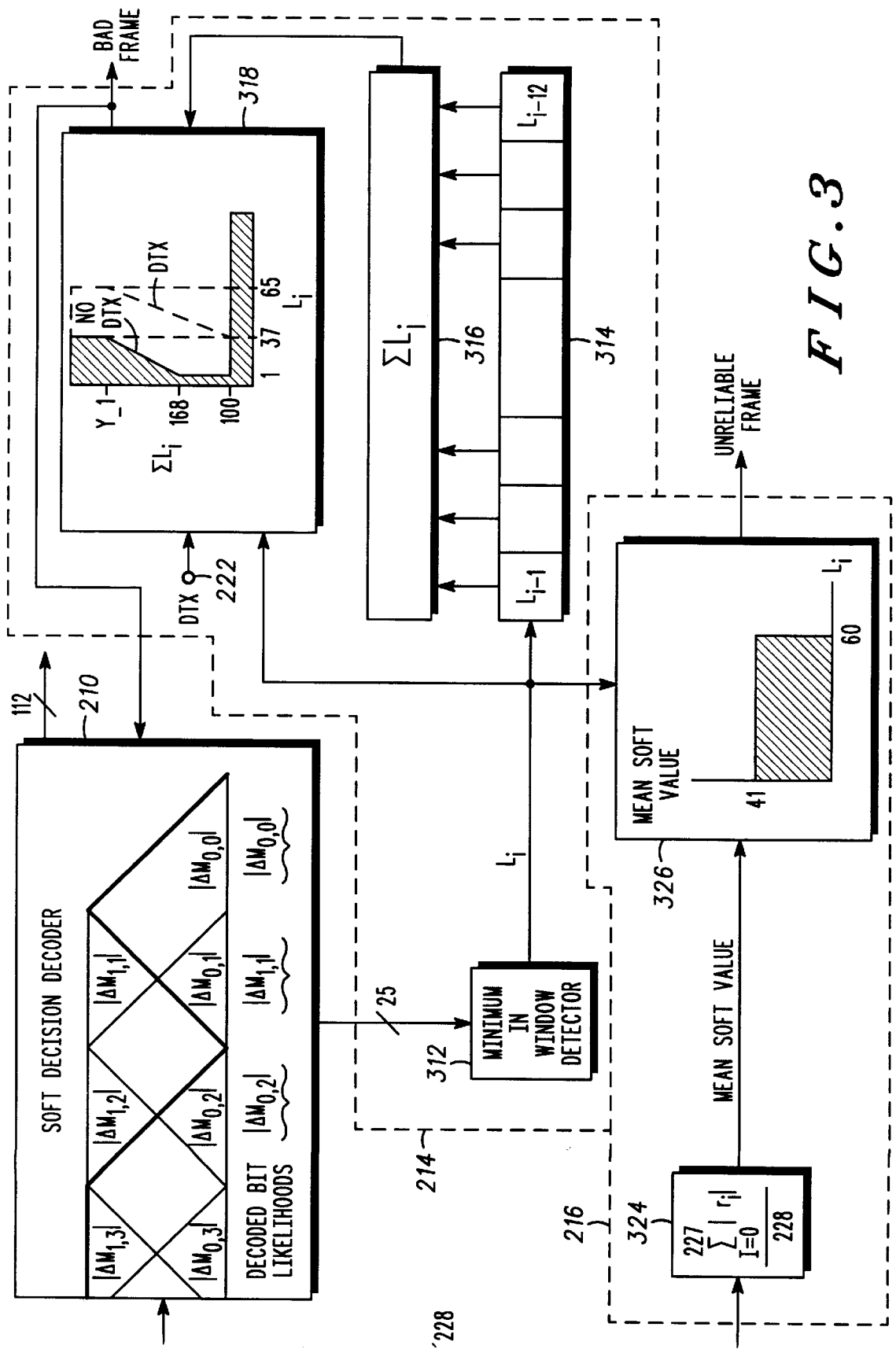

BAD FRAME DETECTOR AND TURBO DECODER

FIELD OF THE INVENTION

The present invention pertains to bad frame detectors and turbo decoders.

BACKGROUND OF THE INVENTION

To maintain good audio quality in a radiotelephone, the radio receiver must pass to the speech decoder an indication of the quality of the speech frame. This binary indication must allow for the following considerations: a non-traffic channel input (noise or control channel) is always detected as bad; a high signal-to-noise ratio (SNR) traffic channel input is always detected as good; and a large majority of correctable traffic channel frames are detected as good.

By meeting these criteria, a high degree of muting and speech extrapolation by the speech decoder can be avoided. Additionally, a receiver meeting these requirements will operate to specification in a system such as the global system for mobile communication (GSM), IS-136, or IDEN, or other digital communication systems. However, it is recognized that it is difficult to meet these criteria.

One advantageous method of monitoring the speech frame quality uses window error detection in association with a soft decision decoder. For example, the soft decision output of a Viterbi equalizer can be used to detect a bad frame. U.S. Pat. No. 5,229,767, entitled DECODER FOR CONVOLUTIONALLY ENCODED INFORMATION, issued to Winter et al. on Jul. 20, 1993, discloses a decoder which detects a bad frame using the soft information from a decoder to determine whether or not to discard a frame.

One method of improving the performance of a receiver, is to provide so-called "turbo decoding". A turbo decoder employs an iterative process which is repeated to provide improved decoding of a frame. A difficulty with these decoders is determining when to stop repeating the reiterative process. One technique that has been used to stop reiterative decoding is when the decoded values are no longer changing (i.e., when bits stop changing between a logic 1 and a logic 0). Another known method for determining when to stop the iterations of the turbo decoder uses a cyclical redundancy check (CRC). Bits are added to the frame to provide an error indication for turbo decoding. The reiterative process is finished when the error redundancy bits no longer indicate that there is an error. Yet another method uses a fixed number of repetitions (e.g., 10). Each of the above methods has a disadvantage. The use of turbo decoding CRC bits means that additional bits are added to the data frame for turbo decoding. This adds overhead to the data. The other two methods add overhead in the processing, in that many iterations are necessitated by the process itself.

Accordingly, there is need for improved decoding and error detection.

BRIEF DESCRIPTION OF THE DRAWINGS

FIG. 3 is circuit schematic in block diagram form illustrating a window error detector.

DETAILED DESCRIPTION OF THE INVENTION

Figure 1:
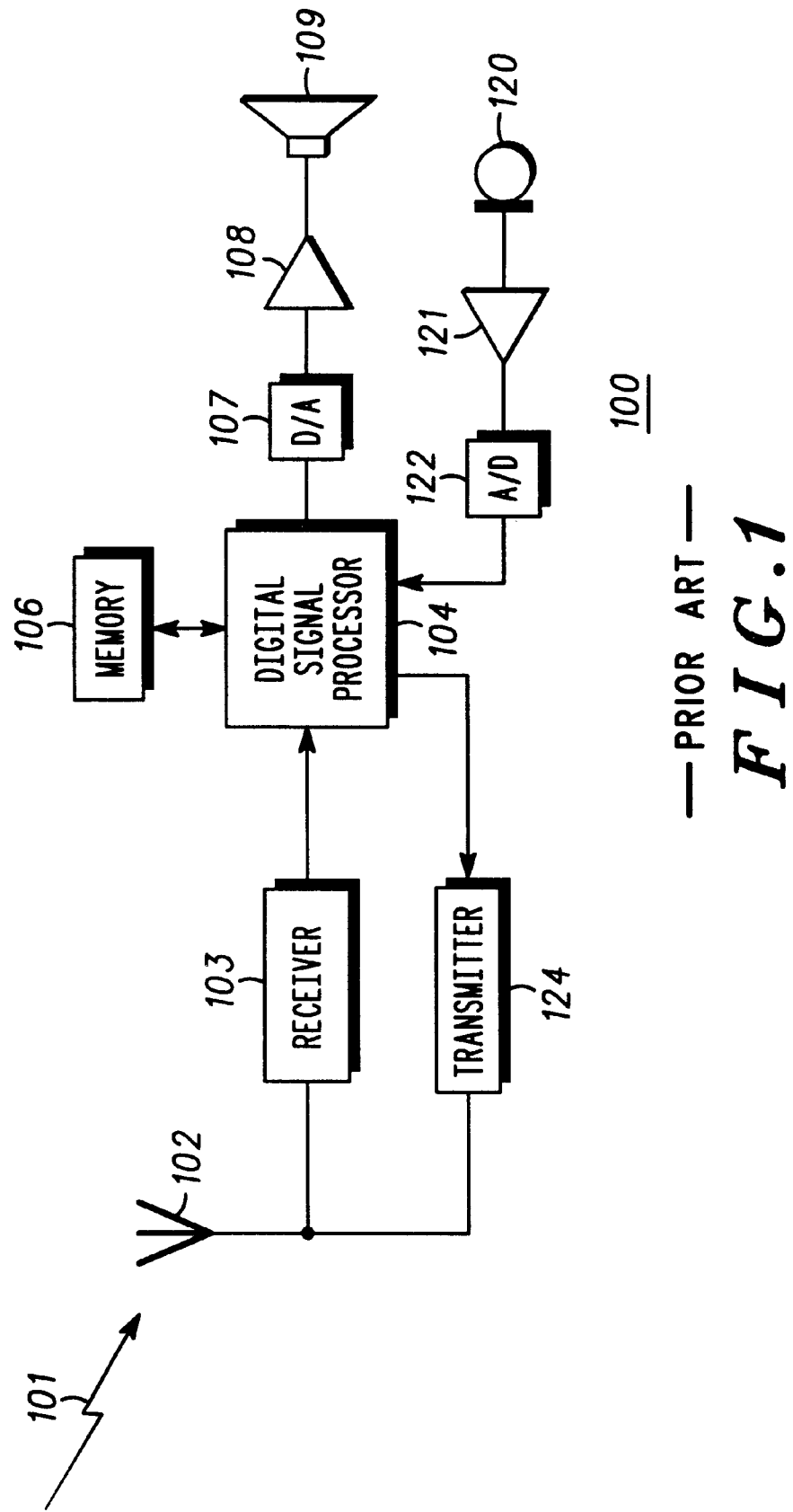
FIG. 1 is a circuit schematic in block diagram form illustrating a transceiver.

The present invention provides an improved window error detector and improved turbo decoder. The improved window error detector utilizes information relating to the discontinuous transmit state to alter a bad frame detector threshold. This allows for a tighter threshold in the discontinuous transmit mode and a looser threshold in a non-discontinuous transmit mode.

An improved turbo decoder takes advantage of the window error detector information to determine when to stop decoding iterations. In particular, the turbo decoder determines that it can stop iterative processing of the data associated with a window when the window error detector detects that the frame is not bad. This provides an indication of an acceptable decoded frame without the use of extra bits as would be required with CRC. Additionally, the iterative process is not repeated after it is no longer needed, as occurs with turbo decoders that stop only after a fixed number of iterations. The use of discontinuous transmit information also provides an advantage over those turbo decoders that continue iterations until the values no longer change, by providing an earlier cut off at a point when a frame can be decoded.

The turbo decoder is advantageous for a discontinuous transmit mode, when fewer frames are transmitted. The turbo decoder can work harder to insure that decodable frames are generated thereby. This insures that signals of improved quality are generated for the local speaker.

A transceiver 100 (FIG. 1) includes an antenna 102 for receipt of signals from a communication link 101. The illustrated device is a transceiver for wireless communication, but it will be recognized that the device may find application in other communication devices, such as satellite phones, landline phones and modems, or any other device that communicates digital information. A receiver 103 receives data from the antenna, processes it, and outputs information to the digital signal processor 104. The digital signal processor converts the data sequence using a program stored in memory 106. Received speech signals are converted into analog signals in digital to analog converter 107, and amplified in amplifier 108 to drive speaker 109.

Signals to be transmitted are detected by microphone 120, amplified in amplifier 121, and converted into digital signals in analog to digital converter 122. The digital signals are input to digital signal processor 104. A transmitter 124 generates signals for transmission over the air link 101.

The transceiver 100 can operate in a continuous transmit mode or a discontinuous transmit mode. In the discontinuous transmit mode, the data capacity of a wireless transmission system in which transceiver 100 operates is increased by a remote site (e.g., a base station) transmitting less information, as is known in the art. Thus intervals between speech, for example, are not transmitted by the remote site. For example, in a time division multiple access (TDMA) system, information is communicated during each time slot dedicated to device 100 in a continuous mode, but only during those time slots that speech is present for discontinuous transmit mode. Digital signal processor 104 identifies the discontinuous transmit mode in a conventional manner.

Figure 2:
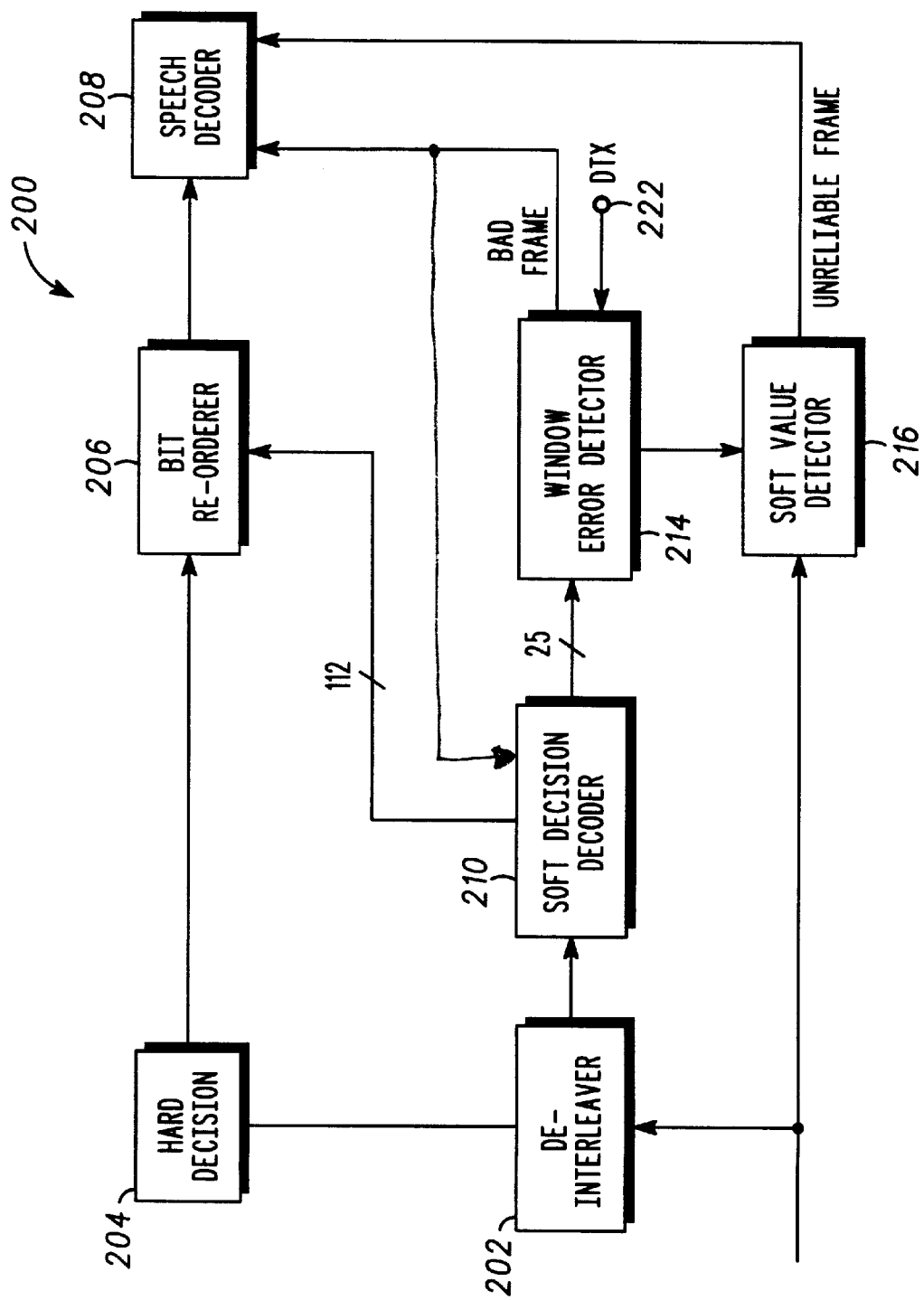
FIG. 2 is a circuit schematic in block diagram form illustrating a decoder.

To decode the data, information received from the transmission link 101 is de-interleaved by an optional deinterleaver 202 (FIG. 2). Those skilled in the art will recognize that the deinterleaver is not required where the data was not interleaved prior to transmission. Deinterleaved uncoded data is processed in a hard decision circuit 204, and reordered in an optional reorderer 206.

A soft decision decoder 210 is employed to decode the encoded data. The soft decision decoder may be provided by any soft decision decoder that produces soft outputs, such as a soft output Viterbi equalizer or a maximum a posterior decoder, suboptimal variations thereof, or the like. Additionally, the decoder can be used without the hard decision circuit 204. The decoder may advantageously be a turbo decoder. The data may also be convolutionaly or block encoded, or the like.

The output of the soft decision decoder 210 is input to the bit orderer 206. Information from the soft decision decoder 210 is also provided to a window error detector 214. Window error detector 214 analyzes the information responsive to soft decision information in the decoder, and optionally responsive to a discontinuous transmit signal at input 222, to detect a bad frame. The discontinuous transmit signal may be advantageously employed with or without a turbo decoder for soft decision decoder 210. If the soft decision decoder is not a turbo decoder, the feedback from the window error detector 214 to the soft decision decoder 210 is not required. Likewise, a turbo decoder for the soft decision decoder 210 can employ a window error detector with or without the discontinuous transmit information.

A soft value detector 216 may also be employed to detect an unreliable frame. The bad frame indication from window error detector 214 and the unreliable frame indicator from soft value detector 216 are input to the speech decoder 208. The speech signals from the decoder are provided to drive speaker 109 (FIG. 1). The decoder 210 and window error detector 214 of FIG. 2 are implemented in the digital signal processor 104, which can be implemented using a microprocessor, a microcomputer, a digital signal processor, or the like.

With reference to FIG. 3, the window error detector 214 derives its input from the decoded bit likelihoods in a soft decision decoder 210. In one embodiment, the differences between the path metric of the surviving metric (i.e., the path through the decoder that is selected) and the best deleted path is output as Li. A larger path metric difference corresponds to a more reliable decoder output. In other words, the greater the difference between the selected path and the next best path, the more reliable the path is determined to be.

Using the last 25 path metric values, the minimum amongst them is selected as the reliability factor in minimum detector 312. A sum of the 12 previous selected minimum reliability factors is also generated using shift register 314 and summer 316. The long term measurement interval is chosen to be 12 as it is considered to be the shortest interval of speech frames that is likely to contain one good speech frame.

A bad frame threshold is set in the bad frame detector 318 which is represented by the following criteria and illustrated by the graph in block 318 of FIG. 3:

if the reliability factor is greater than a threshold T1, the input frame is indicated as good;

if the reliability factor is below a threshold K1, the input frame is reported as bad;

if the sum of 12 minima is below a threshold K2, the input is identified to be bad;

if the relationship between and the reliability factor and the sum of 12 minima is below a threshold T2, the input frame is reported as bad; and in any other case, the frame is detected as good.

The thresholds T1 and T2 are varied depending upon the determination of whether the transceiver is in discontinuous transmit (DTX) mode. In the case of the discontinuous transmit state, tighter thresholds are used to ensure a lower percentage of bad frames reported as good frames passed to the speech decoder. In the illustrated embodiment, the bad frame indication occurs in the shaded area. The loose threshold (T1) for no discontinuous transmit mode is set to 37. The tight threshold (T1) for discontinuous transmit mode is set to 65. If the sum of Li is less than 100 (K2), the frame is detected as bad. For T2, the slope is selected to be 4, such that the threshold for curve T2 is selected to be $\Sigma Li=168+4*Li$. K2 is 1.

Additionally, if an input speech frame is known to contain control information, the minimum is set to 0 in minimum detector 312 and the speech frame is detected to be bad (producing a bad frame indication at the output) by bad frame detector 318. This prevents window error detector 214 from falsely indicating a good channel using the second criteria (i.e., the sum of the last 12 minimum). Then the speech decoder processes the frame as a non speech frame.

As can be seen, for discontinuous transmit (DTX), the threshold for detecting bad frames is moved to the right in block 318, making it harder for frames to be pass as good frames. This is important, as during discontinuous transmit mode, some frames which would otherwise have been transmitted are not sent. Consequently, nothing is sent by the remote site in place of a signal that would otherwise be transmitted. This is done to reduce system interference so as to increase the capacity of the communication system. It is important that the frames associated with non-transmitted signals are not received and decoded as speech. By making the bad frame threshold in bad frame detector 318 greater, it is less likely that the frames associated with non transmitted signals will be detected as speech and decoded.

The use of turbo decoders for soft decision decoder 210 makes it possible to iteratively reprocess frames until a frame is detected as a good frame. The window error detector 214 provides a particularly advantageous method of determining when to stop the iterative process. Preferably, the number of iterations is set to a maximum, such as ten. The iterative process will be repeated until the window error detector no longer detects a bad frame, or the maximum number of iterations permitted is reached. If the communication system has a strong channel, then one decoding iteration by decoder 210 may be sufficient. In particularly problematic situation, the process will be repeated to the maximum number of permitted iterations. The maximum limits the resources required, but the ability to stop before the maximum significantly reduces the number of iterations required for a particular window.

A turbo decoder can be employed to help take advantage of the discontinuous transmit signal provided at input 222. The bad frame threshold in 318 during discontinuous transmit is increased to insure that frames which were not transmitted do not result in decoder 208 producing a decoded frame. Because the bad frame threshold is higher, the number of iterations may be greater in the discontinuous transmit mode relative to the continuous transmit mode. In other words, it may take more iterations before the frame passes the bad frame detector 318 in the discontinuous mode. However, this allows the system to increase its capacity while the transceiver works to insure that only speech signals are decoded.

The soft value detector 216 may also be employed. The soft value detector includes a mean soft value generator 324 (FIG. 3). An unreliable frame detector 326 output an unreliable frame indication when the mean soft value is below a constant K3 (illustrated to be 41) and the reliability factor Li is below a constant K4 (illustrated to be 60). This additional information may be used by the speech decoder 208 in decoding the received data.

Thus it can be seen that an improved bad frame detector and turbo decoder are disclosed. While the inventions are illustrated in a speech decoder, those skilled in the art will recognize that the inventions can be used in non-speech systems.

What is claimed is:

1. A window error detector for a receiver capable of operating in a discontinuous transmit mode, comprising:

a soft decision decoder producing soft output and generating window error signals;

a detector coupled to the soft decision decoder for detecting a bad frame when the window error exceeds a bad frame threshold, wherein the threshold is altered based on the discontinuous transmit.

2. The window error detector as defined in claim 1, wherein bad frame threshold is higher, and is thus a tighter threshold, in the discontinuous transmit mode, and lower, and thus a looser threshold, in a non-discontinuous transmit mode.

3. The window error detector as defined in claim 1, wherein the soft decision decoder is a turbo decoder, and wherein the turbo decoder stops iterative decoding a window when the detector no longer detects a bad frame for that window.

4. A turbo decoder for a receiver comprising:

a soft decision decoder; and a window error detector coupled to the soft decision decoder, the window error detector generating a bad frame indication;

wherein the turbo decoder stops iterative processing of the data associated with a window when the window error detector detects that the window does not result in a bad frame indication.

5. The turbo decoder as defined in claim 4, wherein the soft decision decoder is responsive to a discontinuous transmit mode signal to increase a bad frame threshold during the discontinuous transmit mode.

* * * * *